57-283 SR
OR RE 061

RE 61.

Reissued Mar. 12, 1844.

N. PETERS, PHOTO-LITHOGRAPHER, WASHINGTON, D. C.

61
OR IN 2873

Sheet 2 - 2 Sheets.
M. Day.
Spinning Mach.
No. 61.
Reissued Mar. 12, 1844.
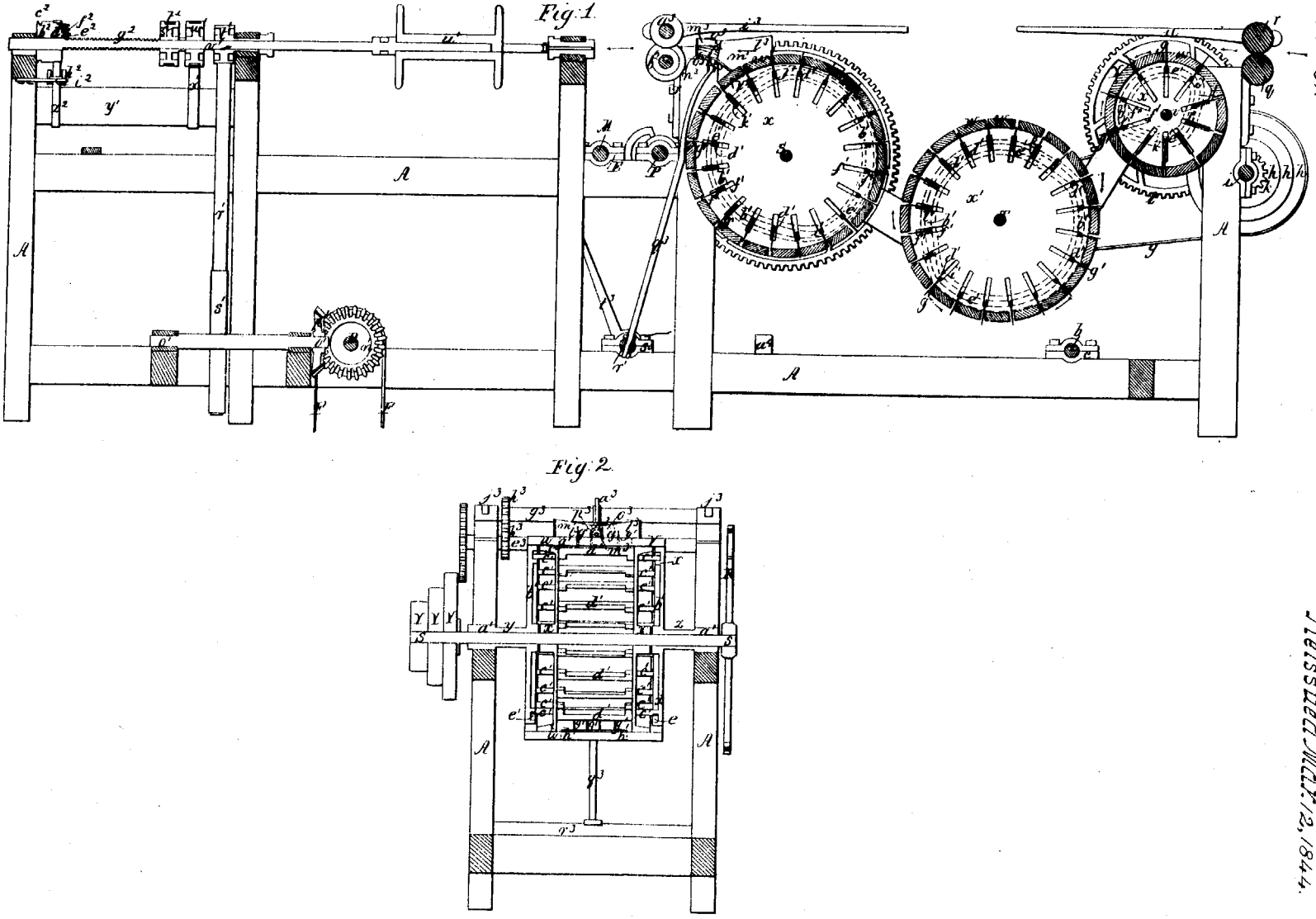
N. PETERS, PHOTO-LITHOGRAPHER, WASHINGTON, D. C.

57. TEXTILES, SPINNING,
TWISTING AND TWINING.
34

Search Room

UNITED STATES PATENT OFFICE.

MOSES DAY, OF ROXBURY, MASSACHUSETTS.

IMPROVEMENT IN MACHINES FOR PREPARING AND SPINNING HEMP, &c.

Specification forming part of Letters Patent No. 1,580, dated April 30, 1840; Reissue No. 61, dated March 13, 1841.

*To all whom it may concern:*

Be it known that I, MOSES DAY, of Roxbury, in the county of Norfolk and State of Massachusetts, have invented new and useful improvements in machinery for preparing and spinning hemp and such other fibrous materials to which the said improvements are applicable, of which the following is a specification.

These improvements, the principles thereof, and manner in which I have contemplated their application, by which they may be distinguished from other inventions of a like character, together with such parts, improvements, or combinations I consider as new and claim to be of my invention and discovery, I have hereinafter set forth and described, which description, taken in connection with the accompanying drawings, hereinafter referred to, compose my specification.

Heretofore it has been customary to prepare hemp previous to its being spun by hackling it or otherwise straightening and separating its fibers. These operations require much manual labor, and consequent expenditure of capital invested in the manufacture of ropes.

Like the generality of inventions, the object of that specified is the reduction of manual power by the substitution of machinery therefor, particularly in the process of preparing the hemp or other fibrous material for spinning.

Figure 1:
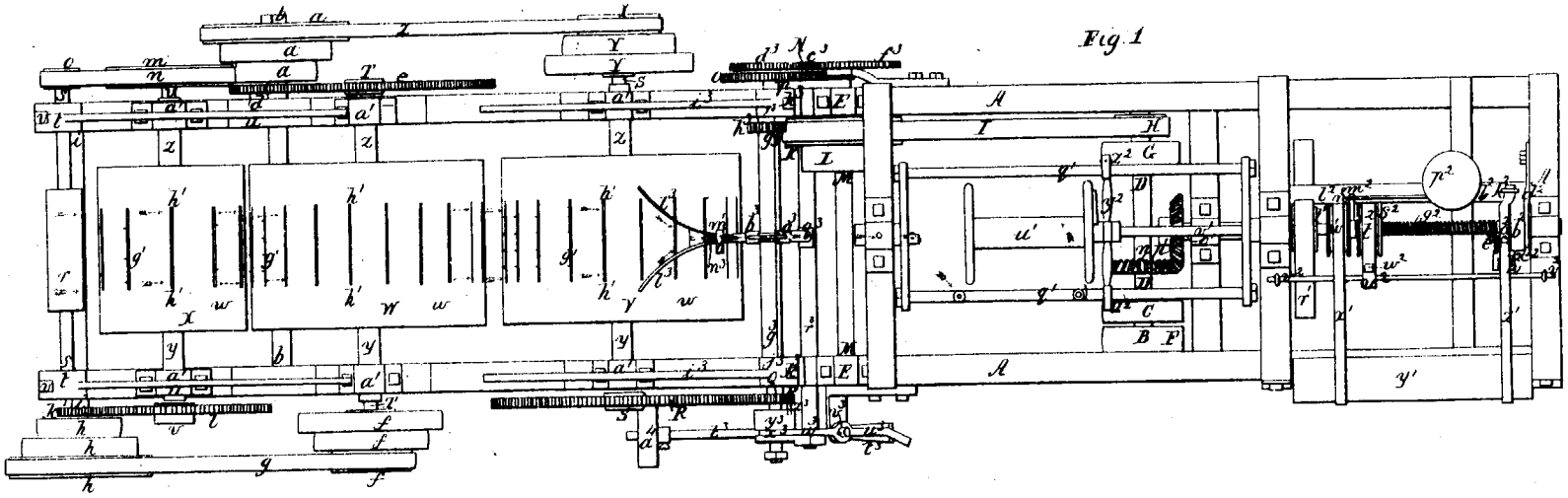
Figure 2:
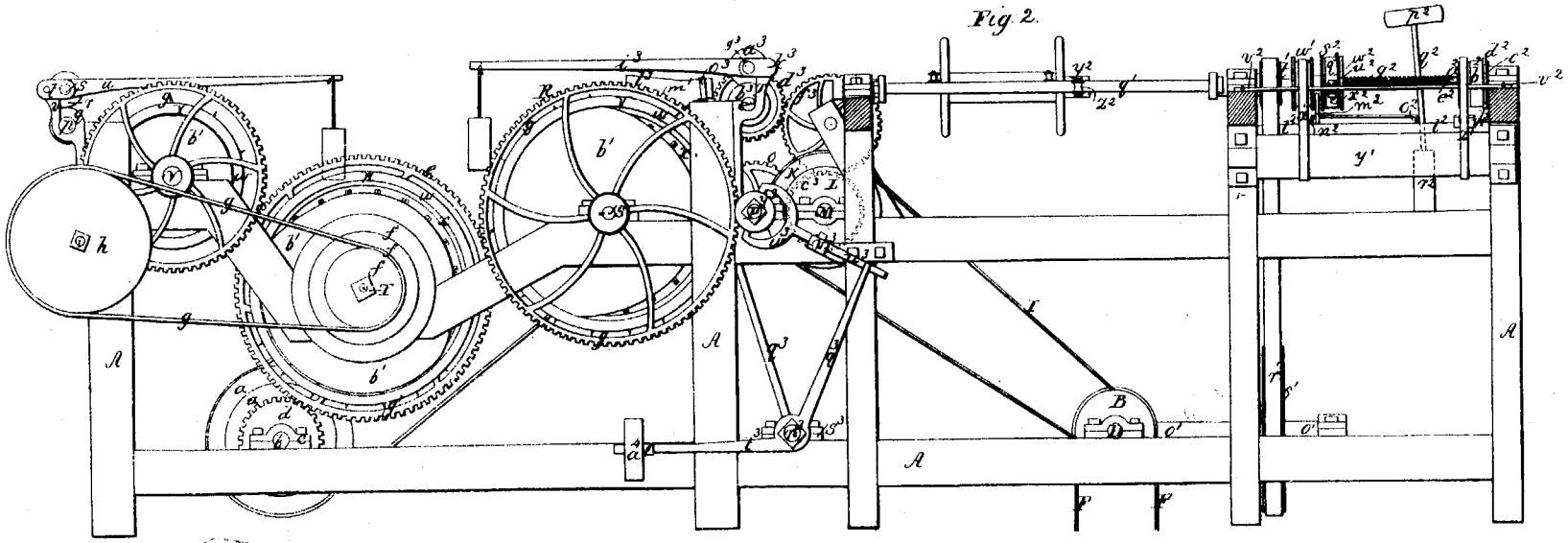

My improvements are represented in the figures of Plates 1 and 2, the former of which exhibits an orthographical projection or top view of the same, as shown in Fig. 1, and also an elevation of one side of the machinery, as seen in Fig. 2. Fig. 1, Plate 2, is a longitudinal or central section, while Fig. 2 shows some of the parts in detail for the purpose of better elucidating the arrangement of the whole in combination.

A A A A throughout the different views represent the frame-work, which may be constructed of wood, iron, or other suitable material, and formed in any other manner to support the operating parts thereto attached. B is a fast and C a loose pulley on a cross-shaft, D D, Plate 1, Figs. 1 and 2. The belt E, Figs. 1 and 2, Plates 1 and 2, from the driving-power passes over one or the other of these pulleys, according to circumstances. Two pulleys, G H, are attached to the shaft D D near its other end. Around either of these, at pleasure, a belt, I, passes to and around a pulley, K or L, on a shaft, M M, Plate 1, Figs. 1 and 2, and Plate 2, Fig. 1. The shaft M M revolves in suitable bearings, E E, and has a cogged pinion, N, (see Fig. 1, Plate 1,) affixed near its outer extremity. The teeth of this cogged pinion engage with those of a cogged wheel, O, on the extremity of a horizontal shaft, P P, Figs. 1 and 2, Plate 1, and Fig. 1, Plate 2. The shaft P has a cogged pinion, Q, Fig. 1, Plate 1, placed thereon, whose teeth engage with and set upon those of a cogged wheel, R, Figs. 1 and 2, Plate 1, and Fig. 1, Plate 2, situated on the end of another shaft, S. There are three shafts, S, T, and U, upon which the drums V W X are situated and revolved by the motions of these shafts.

As these drums or hollow cylinders and machinery to operate the points will be particularly described hereinafter, I now proceed in the description of the connection of the pulleys, belts, and geared wheels, which put the drums in motion. The shaft S has on its other extremity (see Fig. 1, Plate 1) a set of pulleys, Y Y Y, of different diameters, as represented in the drawings. From either of these said pulleys a belt, Z, passes to and around its corresponding pulley of another series, *a a a*, affixed on the end of another shaft, *b b*, the said shaft being represented in Plate 1, Figs. 1 and 2, and Plate 2, Fig. 1, revolving in suitable boxes or bearings, *c*. A pinion, *d*, on the shaft *b b* (see Plate 1, Fig. 2) engages with and turns a cogged wheel, *e*, on the extremity of the shaft T, and of course causing said shaft T to revolve also. A set of pulleys, *f f f*, Plate 1, Figs. 1 and 2, is placed on the opposite extremity of the shaft T. From either of these pulleys, at pleasure, a belt, *g*, passes to and around a corresponding pulley of another set, *h h h*, on a shaft, *i i*, (see Plate 1, Figs. 1 and 2, and Plate 2, Fig. 1,) thus communicating motion to the said shaft. The motion is thence continued to the shaft U by means of a cogged pinion, *k*, on the shaft *i i*, engaging with a cogged wheel, *l*, on one extremity of the shaft U. A large pulley, *m*, Plate 1, Fig. 1, is placed on the other extremity of the shaft U. From this pulley a belt, *n*, passes to and around a smaller pulley, *o*, 57. TEXTILES, SPINNING,
TWISTING AND TWINING.
34
Search Room annexed on the end of another shaft, *p*, Fig. 2, Plate 1, thus communicating motion to said shaft *p*. The feeding roller or cylinder *q* is placed on the shaft *p*, having directly over it another and similar roller, *r*, whose shaft *s s* has its journals resting and turning in bearings *t t*, formed in the levers *u u*, Plate 1, Figs. 1 and 2. The fulcrum of each of these levers is in the top of a standard, *v v*. Weights are to be hung on or near their other ends, in order to produce sufficient pressure to enable the rollers to draw the hemp or other fibrous material from the quantity to be spun and feed the machinery with the same.

Having thus described the machinery through which motion is communicated to the different cylinders, rollers, &c., of that portion of my invention whose office is to prepare the fibrous material or reduce it to a suitable state to be spun into yarn, I now proceed to explain the construction of the drums or cylinders V W X, and their mode of operation on the hemp or flax. Each of the said drums, it will be perceived by inspection of Plate 1, Figs. 1, 2, and Plate 2, Figs. 1, 2, consists of a hollow cylinder, W, attached to two circular disks or plates, *x x*, these said plates being placed on and fixed to a central shaft, S, T, or U. Thus when said shaft is put in motion the hollow cylindrical drum W is caused to revolve on its axis. Each of the shafts S T U passes through and turns in a hollow shaft similar to that shown at *y z* in Fig. 2, Plate 2. These hollow shafts are stationary or fixed at one of each of their ends by being secured or otherwise properly connected to the boxes *a' a'*. At each of the other extremities of the hollow shafts *y z*, and directly in front of the disks *x x*, grooved cams *b b* are affixed, of the shape represented by red lines in Plate 2, Fig. 1, and partly by black in elevation and section in Fig. 2, Plate 1, and Fig. 2, Plate 2. The cylindrical ends *c' c'* of metallic bars *d d* are also inserted in the eccentric grooves *e' e'* of the cams. The bars *d' d'* are also placed and move in slots or rectangular spaces *f' f'*, formed in or cut through the disks or plates *x x*. Each of the bars *d'* has a series of metallic points, *g' g' g'*, &c., affixed thereto, which radiate through slots or long spaces *h' h'*, formed in the periphery of the drums, as seen in the different drawings. These metallic points or teeth vary in their lengths, those near the center of the drums being longer than those near the sides of the same, the object of which arrangement will be more particularly specified hereinafter. Now, from what has been described it will readily be seen that when the drums V W X are put in revolution the metallic points *g' g' g'* must advance and recede alternately, or, more particularly, while they travel through the circular space *i' j'* into the eccentric portions *j' k'* they recede from the circumference of the cylinder until they enter within the periphery of the drum, and remain so while they travel in the portion *k' l'*; thence through the eccentric part *l' i'* they are advanced until they reach again the circular part of the groove *i' j'*. Now, suppose the hemp or other fibrous material to be entered between the feed-rollers *q r*, and received upon and by the metallic points of the drum X, as represented by the blue arrows in Plate 2, Fig. 1. The circumference of the drum X, moving with a somewhat greater velocity than the surfaces of the feed-rollers, draws down (a very little) the hemp during its passage over its upper surface toward the drum W, whose lower points then advance to receive as the points of the drum X recede and leave it. The motion of the periphery of the second drum, W, being increased above that given to the circumference of the drum X, causes the fibrous material to be drawn out a second time during its passage over the under surface of the cylinder or drum W; thence from W it passes to and over the drum V to the regulator *m*, and from said regulator to the spinning or twisting part of the machinery. The velocity of the periphery of the drum V is also increased above that of W, so as to draw the material down a third time, and as it departs from the cylinder or drum V, in its passage from thence to the regulator *m'*, the points of this cylinder are caused by the eccentric grooves of the cams to recede almost immediately from the hemp, and leave it free to pass through the regulator. It will likewise be observed that the teeth near the extremities of the drum disengage from the hemp before those near the center of the same, thereby facilitating the formation of the roving, which the peculiar shape and construction of the regulator *m'* (to be hereinafter described) is calculated to produce.

The above constitutes the description of the construction and operation of that part of my improvements whose object is the final preparation of the fibrous material for the process of spinning.

I will now proceed to describe the improvements in that part of the machinery which twists and spins the fibers into yarn. A beveled wheel, *n*, Plate 1, Fig. 1, placed on the shaft D, communicates motion to another shaft, O', through a beveled gear, *p'*. From thence motion is given to the flier *q'* by means of a belt, *r'*, passing from a large pulley, *s'*, on the shaft *o'*, to and around a pulley, *t*, attached to the neck of the flier, as seen in the different drawings.

The construction of the flier *q'* and bobbin *u'* will be readily understood by inspecting the drawings.

My principal improvement in this part of the machinery consists in the mode of vibrating the spindle and retarding the bobbin to cause it to take up the yarn as fast as the same is spun or twisted. The spindle *v'* has a pulley, *w'*, affixed thereon, from which a belt, *x'*, passes to and around a cylinder or drum, *y'*, Plate 1, Figs. 1 and 2. Another belt, *z'*, passes from the other end of the drum to one or the other of the pulleys $a^2$ $b^2$. A groove, $c^3$, is cut in the circumference of the pulley $b^2$, and a fork, $d^2$, inserted therein, while at its other end it is screwed or otherwise fixed to the frame-work A A. The object of the fork is to hold the pulleys $a^2$ $b^2$ in the same situation during their revolutions. The pulley $a^2$ is a little less in diameter than the pulley $b^2$. A small dog or forked piece of metal, $e^2$, is arranged in proper supports $f^2$, which are properly attached to the side of the pulley $a^2$, its forked end being inserted between the threads of a common screw, $g^2$, formed on the spindle $v'$. The pulley $a^2$ is a little smaller in diameter than the pulley $w'$, while the diameter of the pulley $b^2$ is a little larger than that of $w'$. From this it follows that when the belt $z'$ is thrown over the pulley $a^2$, the rate of its revolutions is somewhat increased above that of $w'$, and therefore the effect would be, as this pulley is kept in place or in one position during its revolutions, to cause the small fork $e^2$ to travel in the groove or between the threads of the screw, and by so doing to press the spindle forward until the fork arrives at the termination of the screw. Then if the belt $z'$ is shifted or thrown upon the pulley $b^2$, a reverse effect will be produced, and the spindle forced back until the fork $e^2$ reaches the opposite termination of the thread of the screw $g^2$. The changing of the belt $z'$ from one pulley, $a^2$, to the other, $b^2$, is thus produced. A forked lever, $h^2$, (see Plate 1, Figs. 1 and 2, and Plate 2, Fig. 1,) turns on a fulcrum or support, $i^2$, (see Plate 2, Fig. 1,) attached to the lower side of the upper cross-tie of the frame-work. One end, $j^2$, receives or straddles the belt, while the opposite end is connected by a clasp or staple, $k^2$, with a slide, $l^2$, Plate 1, Figs. 1 and 2. This slide moves longitudinally a short distance, and is supported in staples or grooves, or in any other proper manner. An arm, $m^2$, projects downward from the spindle, with its end resting on the upper surface of the slide $l^2$. Now, when the spindle reaches either extremity $n^2$ or $o^2$ of the long staple $n^2$ $o^2$, the arm $m^2$ will press against said staple $n^2$ $o^2$ causing the slide $l^2$, in which it is arranged, to move longitudinally a sufficient distance to throw the belt $z'$ from one pulley to the other, as the case may be, and reverse the action of the small fork $e^2$ on the thread of the screw $g^2$. A weight, $p^2$, is placed on the top of a rod, $q^2$, which rod $q^2$ rests at its foot in a step formed in the top of the cross-beam $r^2$, as denoted by dotted lines in Plate 1, Fig. 2. The rod $q^2$ is also connected by a proper joint (so as to be easily inclined to a certain distance one side to the other of a perpendicular line) to the edge of the slide $l^2$. The object of this weight and rod is to cause the action of the slide $l^2$ and its forked lever on the bell $z'$, when the arm $m^2$ is traveling back after it reverses the action of the fork $e^2$ on the screw $g^2$. This it effects by the pressure it exerts against said slide when shifted to one side or the other of a perpendicular. A grooved pulley, $s^2$, is fixed on the spindle. A strap of metal, $t^2$, passes around this pulley and traverses at $u^2$ on a rod, $v^2$. A small screw, $w^2$, with a nut, $x^2$, serves to clamp or draw together the ends of the strap $t^2$, so as to cause it to bind upon the periphery of the pulley $s^2$, and produce a sufficient friction thereon to cause the retardation of the bobbin, to enable it to take or wind up the yarn as the same is spun or twisted by the flier. It will be seen that the spindle is dragged around or revolved by the thread, whose strength is sufficient to effect the same.

To enable the cross-head $y^2$ of the spindle to traverse freely backward and forward, I place small rollers $z^2$ $z^2$ in each extremity, where the ends of the cross-heads clasp the flier-bars. Should these bars be expanded by centrifugal force during the rapid revolutions of the flier, they will meet and rest against the rollers $z^2$ $z^2$, and thus these rollers answer the double purpose of diminishing friction and preventing too great an expansion of the flier-bars.

The next and probably most essential part of my improvements is that portion of them whose office is to regulate the size of the yarn, and to prevent also any knots or bunches of the hemp or other material from passing to the drawing-rollers $a^3$ $b^3$, and being twisted up into the yarn by the operations of the spinning machinery. A geared wheel, $c^3$, as represented by dotted lines in plate 1, Fig. 2, is fixed on the end of the shaft M M outside of the cogged pinion N. The teeth of the said wheel communicate motion to another cogged wheel, $d^3$, on the end of the shaft $e^3$ by means of the intervening cogged wheel $f^3$. Another horizontal shaft, $g^3$, is situated directly over and parallel to the shaft $e^3$, these two shafts being geared together by a small gear on each, as seen by a top view at $n^3$. The journals of the upper shaft, $g^3$, revolve in suitable bearings in the levers $i^3$ $i^3$, as seen at $j^3$ $j^3$. The fulcrum of each of the levers $i^3$ is at one end, $k^3$, as seen in the drawings. Weights are to be hung on these levers in order to produce a suitable degree of pressure on the yarn as it passes between the draw-rollers $a^3$ $b^3$, the former of which is on the upper shaft, $g^3$, and the latter on the lower shaft. The regulator $m'$ is shaped with branching or curved sides, $l^3$ $l^3$, (see Plate 1, Figs. 1 and 2, and Plate 2, Fig. 1,) so as to receive the fibers as they leave the points and concentrate them as they pass through the gage to the draw-rollers. This gage consists of two wedge-shape pieces of metal, $m^3$ $n^3$, placed one above the other, as represented in section in Plate 2, Fig. 1. They are pressed together by means of a bent spring, $o^3$, (shaped very much like the letter U,) clasping the end of the regulator. One-half of a conical chamber, $p^3$, is formed in each of the pieces of metal $m^3$ $n^3$, as represented in Plate 2, Fig. 1. The regulator $m'$ is attached to the top of a long rod, $q^3$, Plate 1, Figs. 1 and 2, and Plate 2, Fig. 1, whose lower extremity is properly attached to a horizontal shaft, $r^3$, resting in boxes or bearings $s^3$. A bent lever, $q^3$, is placed on the end of the shaft $r^2$. Its upper end is forked, and clasps or receives the bent end of another lever, $u^3$. The lever $u^3$ vibrates laterally on a pin or bearing at $v^3$, its opposite extremity, $w^3$, being forked, as represented in the elevation, Plate 1, Fig. 1, and inserted in a groove, $x^3$, of a clutch, $y^3$, fitted loosely, but secured so as only to be moved laterally on the shaft P P. A small pin or dog, $z^4$, projecting from the side of the pinion Q and entering into one of a series of holes drilled in the side of the clutch $y^3$, serves to connect the clutch to the cogged pinion Q, and thus while the regulator $m$ remains in the position shown in the drawings the pinion Q is in connection with the shaft P; but when the said regulator is drawn forward the bent lever $t^3$, moving with the shaft $r^3$, presses on the bent end of the forked lever $u^3$, causing the said forked lever to press outward the clutch $y^3$, and thus disengage the pinion Q and shaft P, thereby stopping its action on the cogged wheel R, and consequently the action of all that portion of the machinery whose office is to prepare the fibrous material. A weight, $a^4$, is placed on the other arm of the bent lever $t^3$, so as to serve as a sufficient counterpoise to carry back the regulator $m'$ to its previous position.

From the above it will be perceived that should any portion of the fibrous material be uneven or twisted into knots or bunches when such portions pass into the regulator between the pieces of metal $m^3$ $n^3$, they will adhere therein, so that the drawing-rollers, acting on the material, will draw the regulator forward, and thus stop the action of the whole of the preparative part of the machinery until the said knobs or bunches are reduced and pass through the regulator, which, being accomplished, the said regulator will return back to its former position. Again, it will be observed that this mode of regulating or preventing the accumulation of bunches differs from all others heretofore invented, inasmuch as the knot or bunch in all or most of them is suffered to pass between the drawing-rollers, which serve only to pinch or retain it until the twisting power of the flier overcomes the force of retention and draws the knot (in general but partially reduced) from between the draw-rollers, twisting it into yarn. Again, this detention of the knot by the draw-rollers causes a much greater number of revolutions of the flier on the yarn intervening between it and the draw-rollers than on other portions thereof. The tendency is therefore to reduce the diameter of the yarn, rendering it uneven and irregular in size.

From the above it would appear evident that such machines are an injury rather than a benefit to the process of rope-making, as the grand desideratum is to so twist the fibers together that when laid into a rope each shall have an equal strain or tension.

In my mode of regulating by the above described machinery, these objections are all obviated. The bunch or knot is properly reduced in the regulator by the draw-rollers continually operating and drawing forth the material in proportion to the quantity required by the spinning apparatus.

The particular object of the bent spring $o^3$ is to allow any hard substance in passing through the gage or conical chamber $p^3$ and not susceptible of reduction to separate the pieces $m^3$ $n^3$, and thus be drawn out of the regulator.

The advantages resulting from the above-described arrangement of machinery, both in the saving of labor and the quality of the manufacture, will be readily apparent after learning the principles and mode of operation, as above set forth.

In the first place it will be observed that should the hemp or fibrous material to be spun in this machine be passed through the usual preparative course of hackling, &c., the quality of the rope formed of the yarns will be much superior to that of the major part now manufactured, while a very fine quality of the manufacture would be produced if a part of said hackling process were dispensed with, leaving the remaining part to the effectual operation of the several drums and the machinery connected with the same. Again, the roving produced by the combined operation of the drums and regulator forms a much better yarn or thread than has heretofore been made, inasmuch as the quantity of hemp composing the same is controlled by the hand of the operator alone, which, it will be admitted, is but an imperfect regulator.

The improvement in the mode of vibrating the spindle and bobbin is too palpable to require further comment, and the great saving of manual labor will be apparent when it is stated that one operative can superintend ten or twelve machines, it being only necessary to supply the draw-rollers with the wide sliver of hemp, (so termed,) leaving the machinery to complete the operation.

The proportionate motions or revolutions of the several drums X W V, for hackling or separating and straightening the fibers of the hemp as it passes along to the spinning machinery, have been particularly alluded to in the foregoing description, and it will be perceived that the combination of the said drums having the proportionate motions specified, with the flier and bobbin, gives or imparts to the apparatus the capacity or power of spinning directly from the "wide sliver" of hemp, it being necessary only, as before suggested, to place the said sliver between he feed-rollers, which one operative can do with facility for several machines.

Another and very material advantage secured by the above specified combination is that it allows the fibers to be drawn down easily, uniformly, and without breaking them, and if a bunch of tow or unprepared hemp should pass the feed-rollers, as it frequently does, and is freely permitted to do in my apparatus, the hackling-cylinders clean, straighten, and loosen the fibers of the same and distribute them evenly through the sliver, which cannot be performed by any other machine, as every other kind of apparatus which has heretofore been devised will either break the fibers or permit the knot or lump to pass along and be twisted into the strand or yarn.

The last advantage which I shall mention as possessed by my machine over all others by reason of the aforesaid combination is that if the hemp should not be sufficiently or properly prepared or hackled after being passed through the usual preparative process, this combination of the drums with the flier will complete the work before the sliver passes to be spun.

Having thus completed the description of the principles and mode of operation of my machinery, I shall now proceed to specifically point out those parts I claim as my invention and hold to be original and new They are as follows:

1. The combination of the revolving drums and several rows of teeth with the machinery within the said drums for operating the several series of teeth or metallic points, the whole of the above-specified machinery being constructed and operating substantially in the manner and on the principles hereinabove set forth.

2. The mechanism for preventing the accumulation of knots or bunches or defects in the roving, the same consisting of the peculiar apparatus termed the "regulator" $m'$, arranged so as to be moved between the drum V and the rollers $a^2$ $b^2$, and connected with machinery for stopping the operation of the preparative or drawing drums whenever necessary, for the purposes above mentioned.

3. The combination of the said regulator with the different series of teeth, formed as described, (those near the sides of the drums being shorter than those near the center of the same,) which arrangement, in conjunction with the peculiar shape of the regulator, forms the roving from which the thread or yarn is to be made.

4. Stopping the motions of the preparative part of the machinery by means of the peculiar combination of mechanism, consisting of the regulator $m'$, on the rod $q^2$, the shaft $r^2$, the bent lever $t^2$, on the said shaft, bent lever $u^2$, and clutch $y^2$, on the shaft P P, as herein described.

5. The employment of a single-threaded screw, $g^2$, on the spindle, and the combination of the screw $g^2$, the fork $e^2$, (attached to the side of the series of pulleys $a^2$ $b^2$,) belt $z'$, pulley $w'$, and drum $y'$, the whole being constructed and operating substantially as above described, and for the purpose of imparting a reciprocating rectilinear motion to the spindle and bobbin.

In testimony that the foregoing is a true description of my invention I have hereto set my signature this 30th day of August, A. D. 1843.

MOSES DAY.

Witnesses:
R. H. EDDY,
CHAS. L. PECK.